US006188961B1

(12) United States Patent
Mandal

(10) Patent No.: US 6,188,961 B1
(45) Date of Patent: Feb. 13, 2001

(54) ACOUSTIC LOGGING APPARATUS AND METHOD

(75) Inventor: Batakrishna Mandal, Missouri City, TX (US)

(73) Assignee: Hilliburton Energy Services, Inc., Houston, TX (US)

(*) Notice: Under 35 U.S.C. 154(b), the term of this patent shall be extended for 0 days.

(21) Appl. No.: 09/283,338

(22) Filed: Mar. 31, 1999

(51) Int. Cl.$^7$ ..................................................... G01V 1/50
(52) U.S. Cl. ......................................................... 702/6
(58) Field of Search ............................... 702/6, 7, 10, 11; 367/25, 30, 31

(56) References Cited

U.S. PATENT DOCUMENTS

| | | | |
|---|---|---|---|
| 4,794,572 | 12/1988 | Sondergeld et al. | 367/31 |
| 4,803,666 | 2/1989 | Alford | 367/36 |
| 4,813,028 | * 3/1989 | Liu | 367/25 |
| 4,817,061 | 3/1989 | Alford et al. | 361/75 |
| 4,832,148 | * 5/1989 | Becker et al. | 367/25 |
| 4,881,208 | * 11/1989 | Liu | 367/25 |
| 4,888,743 | 12/1989 | Thomsen | 367/75 |
| 4,903,244 | 2/1990 | Alford | 367/36 |
| 4,933,913 | 6/1990 | Thomsen | 367/75 |
| 4,951,267 | * 8/1990 | Chang et al. | 367/31 |
| 5,027,332 | 6/1991 | Alford | 367/75 |
| 5,029,146 | 7/1991 | Alford | 367/75 |
| 5,136,554 | 8/1992 | Thomsen et al. | 367/75 |
| 5,214,613 | 5/1993 | Esmersoy | 367/31 |
| 5,475,650 | * 12/1995 | Sinha et al. | 367/31 |
| 5,541,890 | * 7/1996 | Tang | 367/25 |
| 5,619,475 | * 4/1997 | Winkler | 367/27 |
| 5,712,829 | * 1/1998 | Tang et al. | 367/25 |
| 5,740,124 | * 4/1998 | Chunduru et al. | 367/25 |
| 5,808,963 | 9/1998 | Esmersoy | 367/31 |
| 5,831,934 | * 11/1998 | Gill et al. | 367/25 |

FOREIGN PATENT DOCUMENTS 0703349  3/1996 (EP).

OTHER PUBLICATIONS

Alain Brie, et al; New Directions in Sonic Logging; Spring 1998; (pp. 40–55); Oilfield Review.

Chung Chang, et al; Localized Maps of the Subsurface; Spring 1998; (pp. 56–66); Oilfield Review.

G. Brewton; *The Geology of the Skinner, Bartlesville and Misener Sandstones in Well DM21A at Catoosa;* Nov. 1996; Amoco Corporation.

B.A. Auld; *Acoustic Fields and Waves in Solids;* (undated); (pp. 68–87); (pp. 163–189); (pp. 191–263); (pp. 367–383); (pp. 383–409); (pp. 411–423); (pp. 1–61); (pp. 63–133); (pp. 375–414); (pp. 397–414); A Wiley–Interscience Publication.

* cited by examiner

*Primary Examiner*—Donald E. McElheny, Jr.
(74) *Attorney, Agent, or Firm*—Conley, Rose & Tayon, P.C.

(57) ABSTRACT

An apparatus and method for determining fast and slow shear wave velocities and orientations in an anisotropic earth formation that reduces the error and ambiguity in calculating these parameters and eliminates the need for dipole receivers and multiple dipole sources. The apparatus generally includes a single dipole source capable of generating an acoustic signal within a borehole. The acoustic logging tool contains multiple levels of receivers. At each level, four receivers, which may be conventional pressure transducers, receive shear/flexural wave signals which propagate along the borehole earth formation. These receivers measure the pressure fields from the wave signals. A processing device, preferably a UNIX™ based computer, interpolates the measured pressure fields between any two adjacent receivers. The processing device performs cross-component decomposition on the pressure field to determine shear wave orientation and velocity. Using the shear wave orientation and velocity the processing device determines transit time anisotropy, energy anisotropy, and slowness anisotropy.

15 Claims, 4 Drawing Sheets

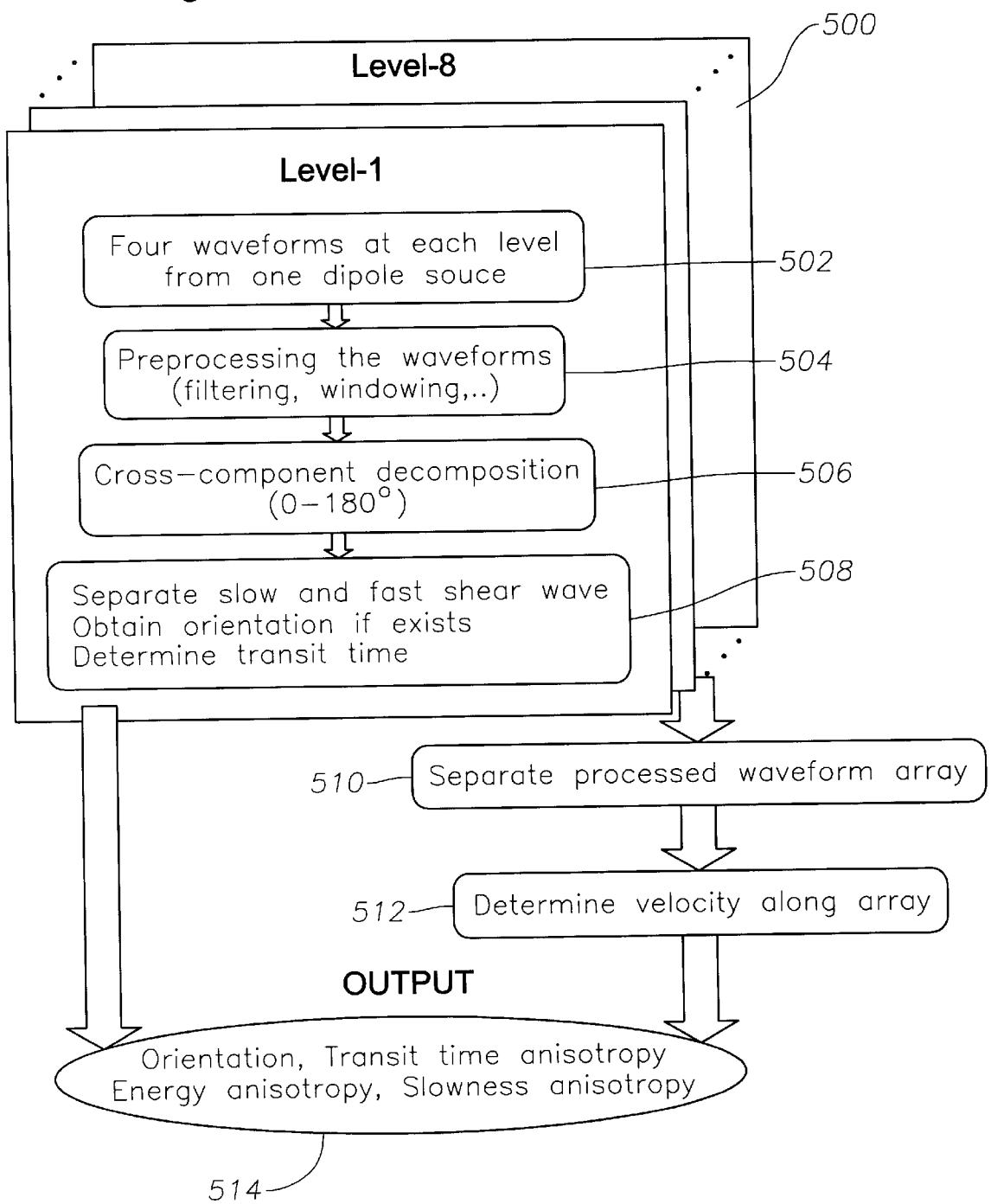

ACOUSTIC LOGGING APPARATUS AND METHOD

BACKGROUND OF THE INVENTION

1. Field of the Invention

The present invention generally relates to acoustic well logging. More particularly, the present invention relates to a new system and method for determining slow and fast shear wave velocities and orientations in an earth formation using receiver signals from an acoustic well logging instrument to determine shear wave anisotropy from a single dipole source.

2. Description of the Related Art

It is well known that mechanical disturbances can be used to cause acoustic (sound) waves in earth formations and that the properties of these waves, also called seismic waves, can be measured to obtain important information about the formations through which the waves have propagated. In particular, parameters of acoustic waves, such as their velocity and direction of particle motion (polarization direction) can be indicators of formation characteristics that help in evaluation of the location and/or producibility of hydrocarbon resources. Methods for determining shear wave velocity and polarization direction in earth formations include acoustic velocity well logging, wherein an acoustic well logging instrument is attached to a wire line and then lowered into a wellbore drilled through the earth formations.

It is a well known phenomena that certain earth formations exhibit a property called "anisotropy", wherein the velocity of acoustic waves polarized in one direction within a particular earth formation may be somewhat different than the velocity of acoustic waves polarized in a different direction within the same earth formation. See, for example, S. Crampin, *A Review of the Effects of Anisotropic Layering on the Propagation of Seismic Waves,* Geophys. J. R. Astr. Soc., vol. 49, pp 9–27, 1977, incorporated herein by reference. Anisotropy may arise from intrinsic structural properties, such as grain alignment, crystallization, aligned fractures, or from unequal stresses within the formation. Anisotropy is particularly of interest in the measurement of the velocity of shear/flexural waves propagating in the earth formations. Shear or S waves are often called transverse waves because they vibrate the ground in the direction "transverse", or perpendicular, to the direction that the wave is traveling.

Acoustic waves travel fastest when the direction of particle motion (polarization direction) is aligned with the material's stiffest direction. Shear wave particle motion is in a plane perpendicular to the wave propagation direction. If the formation is anisotropic, meaning that there is one direction that is stiffer than another, then the component of particle motion aligned in the stiff direction will cause the wave to travel faster than the wave component aligned in the other, more compliant direction in the same plane. As a result, the shear wave splits into two components, one polarized along the formation's stiff (or fast) direction, and the other polarized along the formation's compliant (or slow) direction.

For example, in the case of a series of parallel, vertical fractures, a shear wave that is polarized parallel to the fracture strike will propagate faster than a shear wave polarized perpendicular to it. In general, a shear wave travelling in a vertical (Z) direction will split into two orthogonal components (components which are at a 90° angle relative to each other) polarized along the horizontal (X and Y) directions in the formation. As they propagate along the borehole, the fast wave is polarized along the direction parallel to the fracture strike and a slow wave in the direction perpendicular to it.

Acoustic well logging techniques have been devised for determining the amount of anisotropy from shear wave velocities or corresponding transit time anisotropy, energy anisotropy, and slowness anisotropy. The amount of anisotropy is generally defined as the difference between the velocities of the fast and the slow shear waves in the anisotropic formation. Transit time anisotropy is the arrival-time difference between the fast and slow shear waves at the receivers. It may be obtained from a cross-correlation between fast and slow shear wave arrivals at each receiver spacing. Energy anisotropy is a measure of the pressure field in the cross component (i.e. effect on Y component receivers caused by X component source, XY, and vice versa, YX) waveforms as a percentage of the pressure field on all four components (XX, YY, XY, and YX). In an anisotropic formation, energy anisotropy depends on the degree of anisotropy. Slowness anisotropy is the difference between the fast and slow slowness measured along the multilevel receiver array using various slowness measurement techniques (e.g., semblance processing). Acoustic well logging techniques can also be used to estimate the orientation of the fast and slow shear waves. See, for example, C. Esmersoy et al, *Dipole Shear Anisotropy Logging,* Expanded abstracts of the 64th annual meeting, Society of Exploration Geophysicists, pp. 1138–1142 (1994), incorporated herein by reference.

To measure the velocities of the fast and slow shear waves in anisotropic earth formations, a conventional acoustic well logging tool includes two orthogonal dipole sources and a multilevel array of dipole receivers. The dipole receivers consist of orthogonal receiver pairs at each level aligned with the dipole sources. See, for example, A. Brie et al, *New Directions in Sonic Logging,* Oilfield Review, pp. 43–45, Spring 1998, incorporated herein by reference. Under this arrangement, the acoustic well logging instrument can measure the components of shear wave velocity in any direction in a plane perpendicular to the borehole axis. The measurement involves recording the waveforms on receivers oriented in directions parallel and perpendicular to each transmitter along the tool X and Y axis (the Z axis is parallel to the borehole). The transmitters are alternately triggered to emit acoustic energy impulses into the wellbore. Some of the acoustic energy propagates along the wellbore wall as a shear/flexural wave, substantially at the shear velocity of the earth formation, to be detected by the dipole receivers. If the earth formation is anisotropic, some of the shear wave energy will propagate in the fast direction and some of the shear wave energy will propagate in the slow direction. The amount of the energy which reaches receivers that are parallel to each transmitter depends on the orientation of the fast and slow shear wave polarization directions relative to the transmitters and receivers.

One method of determining slow and fast shear wave velocities and orientations uses a conventional acoustic logging tool 100, as shown in FIG. 1, to detect components of the acoustic signals at each level of dipole receivers. See, for example U.S. Pat. No. 5,712,829 issued to Tang et al., incorporated herein by reference. Two dipole sources X and Y, 102, are oriented orthogonal to each other. Signals detected by the dipole receiver A, 104, parallel to the X source, are referred to as XA signals when the X source is triggered. Similarly, signals detected by dipole receiver B, 106, parallel to the Y source 102 when the Y source is triggered are referred to as YB signals. Cross-component signals can also be detected by the perpendicular receivers when each source is energized, and these signals are referred to as the XB and YA signals for the X and Y sources respectively. Each of the four sets of signals can be represented as a time series, each of which consists of a series of numbers indexed with respect to increasing time from the instant at which the respective source is energized. The ordinate value in each series of numbers represents amplitude of the signal. Shear wave velocity can be represented by a time series of the fast shear wave FSW(t) and a time series of the slow shear wave SSW(t). FSW(t) and SSW(t) are oriented at the formation fast and slow shear wave polarization directions, respectively, and are assumed to be oriented at right angles to each other. The solution to the relative orientation of FSW(t) and SSW(t) includes an angle, θ, subtended between the axis of one of the transmitters (for convenience, the X source) and the polarization direction of the fast velocity. Various solutions to determine these variables exist, see, for example, in U.S. Pat. No. 4,817,061 issued to Alford et al., incorporated herein by reference.

The methods described above for determining slow and fast shear wave orientations and velocities require extensive computation and may suffer because the solution for θ is ambiguous (i.e. is satisfied both by θ and θ+90°). Further the magnitude of the anisotropy (the difference between the fast and slow wave velocities) is often smaller than the magnitude of the error included in the determination of the velocity. Furthermore, two dipole transmitters and at each level two dipole receivers are required to determine FSW(t) and SSW(t) and these represent an undesired cost of the acoustic logging tool. Consequently, an improved lower cost tool and corresponding improved method to determine fast and slow shear wave velocity and orientation in an anisotropic formation is desired.

SUMMARY OF THE INVENTION

The present invention includes an apparatus and method for determining fast and slow shear wave velocity and orientation in an anisotropic earth formation that reduces the error and ambiguity in calculating these parameters and eliminates the need for multiple dipole sources. The apparatus generally includes a single dipole source capable of generating an acoustic signal within a borehole. The acoustic logging tool contains multiple levels of receivers. At each level, four receivers, which may be conventional pressure transducers, receive shear/flexural wave signals which propagate along the borehole earth formation. These receivers measure the pressure fields from the wave signals. A processing device interpolates the measured pressure fields between any two adjacent receivers assuming circular radiation. The processing device performs cross-component decomposition on the pressure field to determine shear wave orientation and velocity. Using the shear wave orientation and velocity the processing device determines transit time anisotropy, energy anisotropy, and slowness anisotropy.

The disclosed device comprises a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a more detailed description of the preferred embodiments of the present invention, reference will now be made to the accompanying drawings, wherein:

FIG. 5 is a flow diagram showing the steps to calculate shear wave orientation, velocity and anisotropy.

DETAILED DESCRIPTION OF PREFERRED EMBODIMENT

Figure 2:
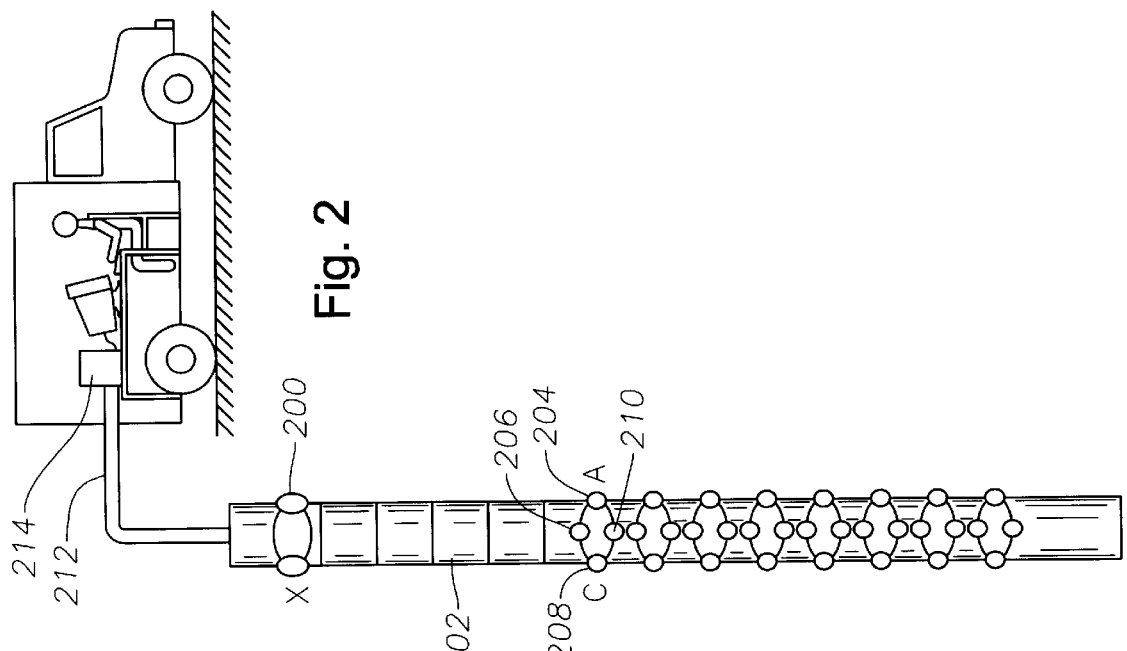
FIG. 2 illustrates an acoustic well logging tool of a preferred embodiment.
Figure 1:
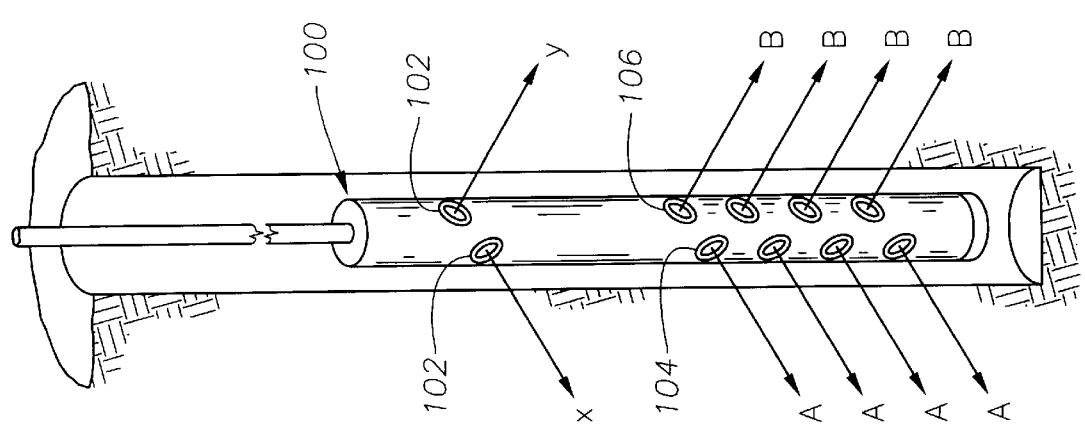
FIG. 1 (Prior Art) illustrates an acoustic well logging tool.
Figure 4A:
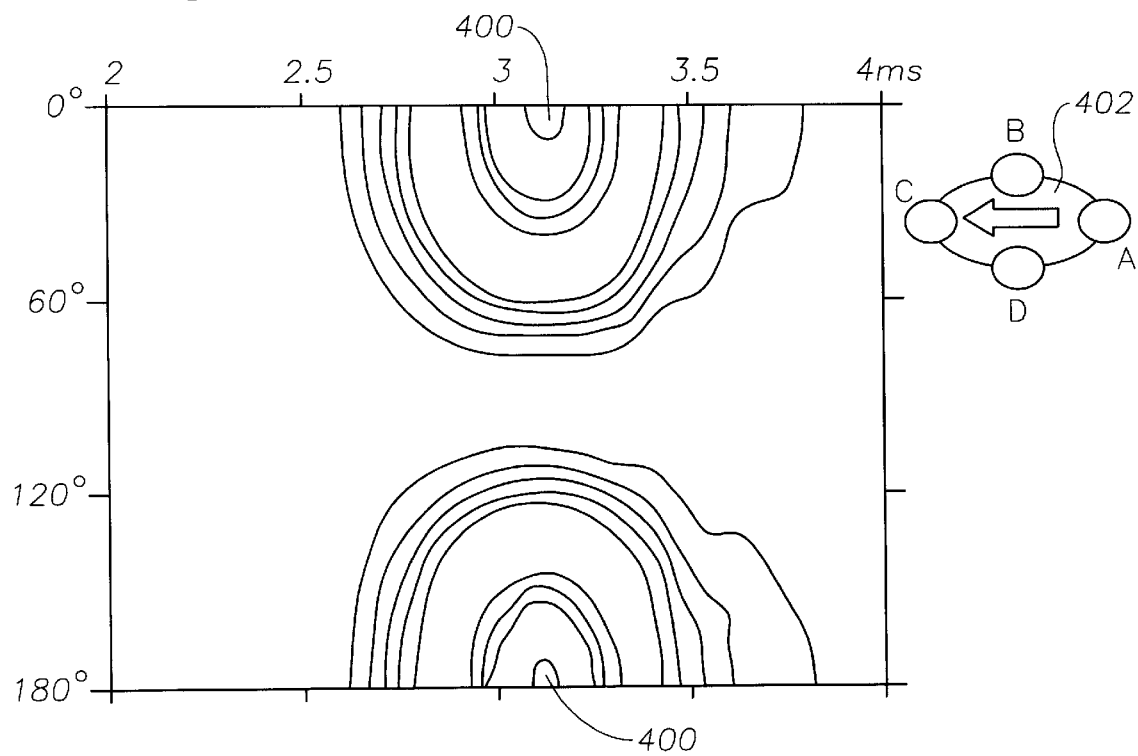
FIG. 4a is one source-receiver orientation of the acoustic logging tool illustrating the pressure field as a function of azimuthal angle using dipole decomposition.
Figure 4B:
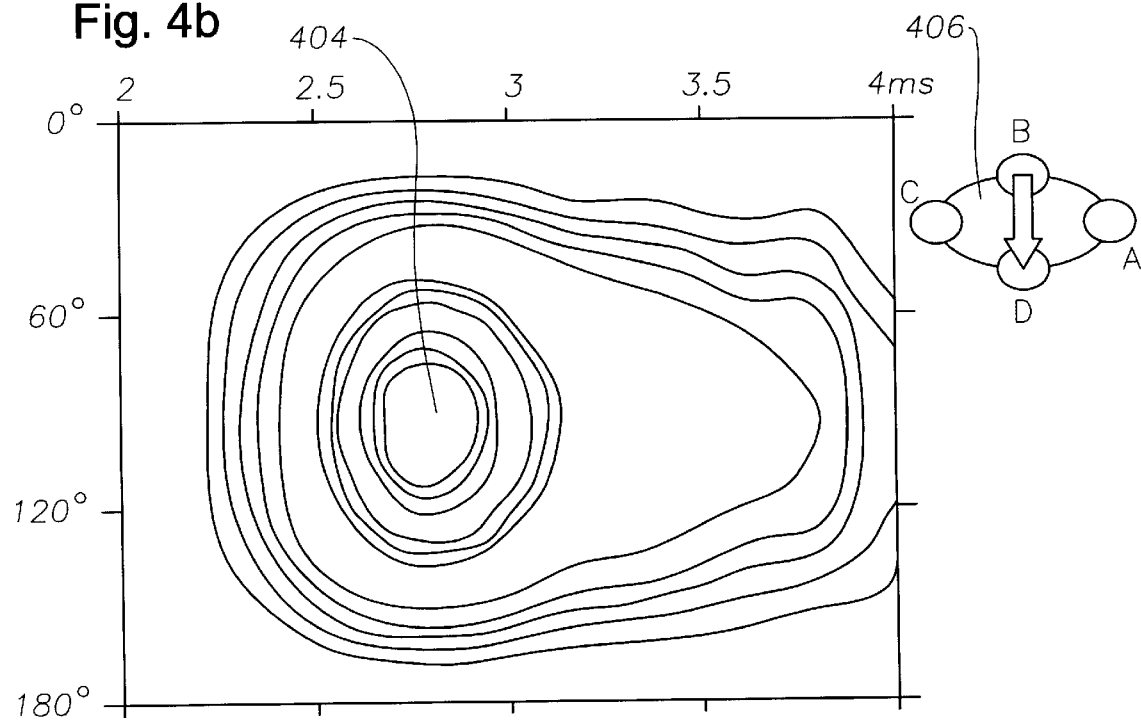
FIG. 4b is a second source-receiver orientation of the acoustic logging tool illustrating the pressure field as a function of azimuthal angle using dipole decomposition.
Figure 4C:
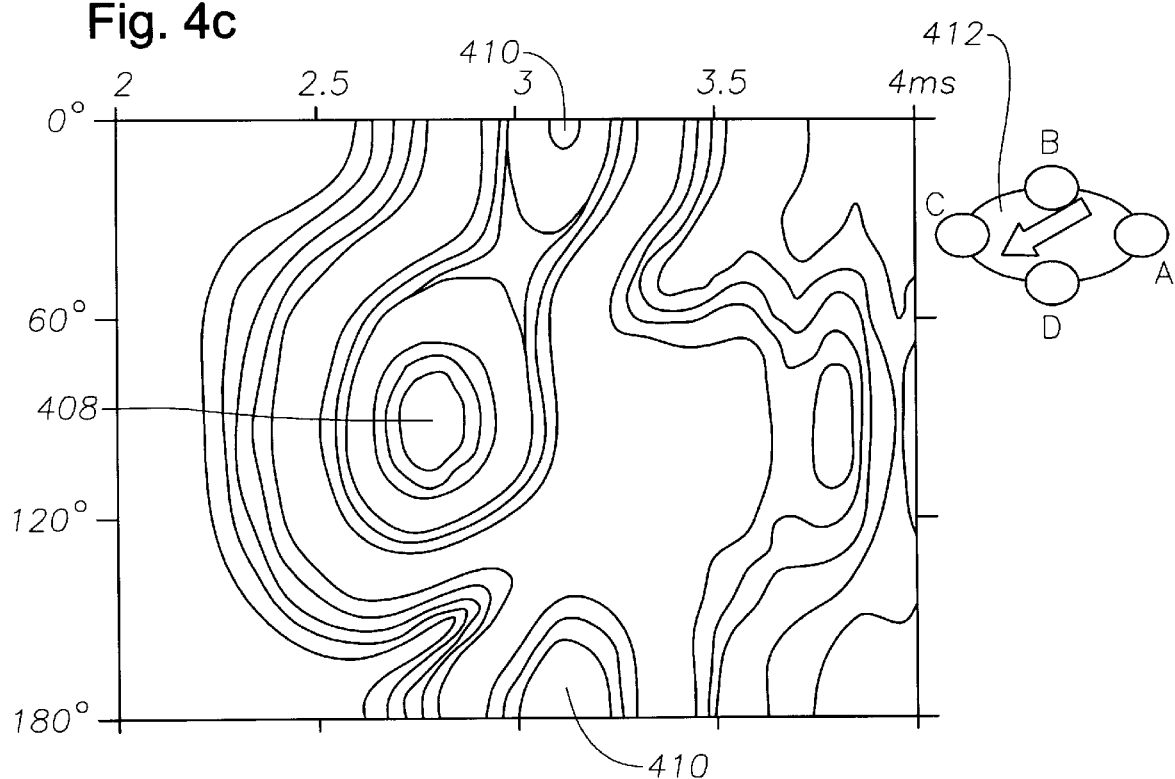
FIG. 4c is a third source-receiver orientation of the acoustic logging tool illustrating the pressure field as a function of azimuthal angle using dipole decomposition.
Figure 4D:
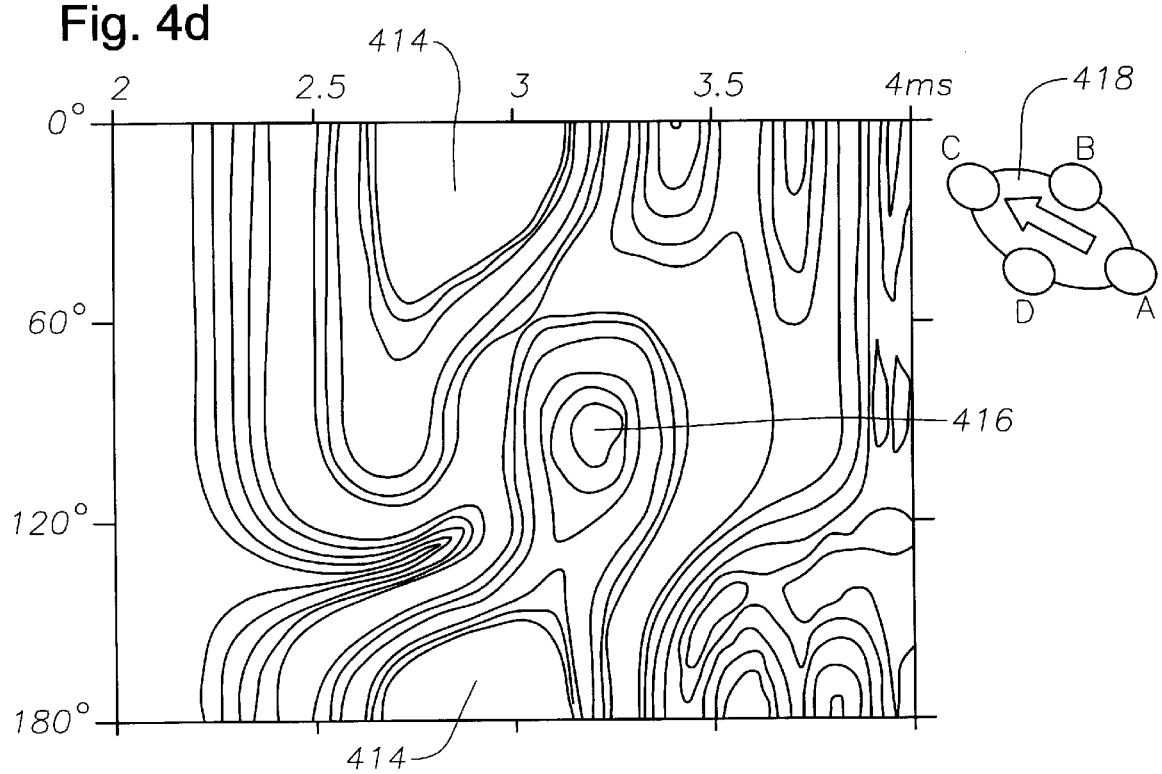
FIG. 4d is the source-receiver orientation of FIG. 4a rotated 45° illustrating the pressure field as a function of azimuthal angle using dipole decomposition.

A preferred embodiment of the acoustic logging tool is shown in FIG. 2. A single dipole source 200 emits sound into the formation which propagates as a wave along the borehole. An isolator 202 prevents unwanted signal components from travelling down the acoustic logging tool shaft. Receivers A, 204, B, 206, C, 208 and D, 210 with angular separation of 90° from adjacent receiver receive acoustic signals from source 200 as these signals travel along the borehole. Additional levels of receivers may also be provided on the tool. The four receivers at each level record the waveforms from the source. The four receivers may be at any arbitrary radial distance from the tool axis. After conversion to a digital format, the receiver waveform data is compressed and sent through a wire line 212 to a computer 214 uphole. If the tool is used for logging while drilling (LWD), the compressed waveform data is stored on a memory device inside the tool. In FIG. 2, the preferred embodiment of the acoustic logging tool shows the source oriented on an axis in parallel to the A and C receivers. As will be described in greater detail below, the source orientation from the receiver is arbitrary and FIG. 2 is only a preferred embodiment.

Figure 3:
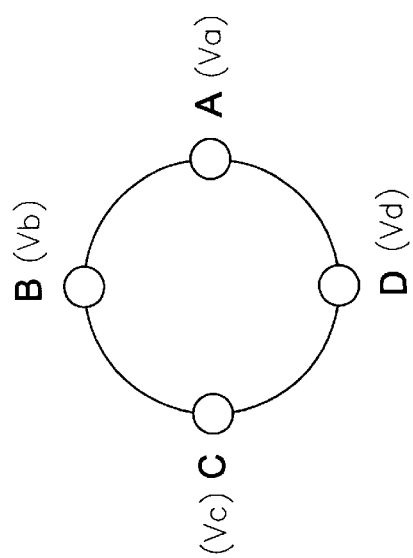
FIG. 3 illustrates the relative orientation for determining the pressure field at four receivers A, B, C, and D at each level.

Let the measured field at four receivers (A, B, C and D) as shown in FIG. 3 be represented by $v_a(v_a(t_1), v_a(t_2), \ldots, v_a(t_n))$, $v_b(v_b(t_1), v_b(t_2), \ldots, v_b(t_n))$, $v_c(v_c(t_1), v_c(t_2), \ldots, v_c(t_n))$, and $v_d(v_d(t_1), v_d(t_2), \ldots, v_d(t_n))$ respectively. The pressure field at any azimuthal angle could be estimated from adjacent waveforms (e.g. between (A, B), (B, C), (C, D), or (D, A)) under the assumption of circular radiation around the tool by the following equations:

$$V_\phi = v_a \cos^2 \phi + v_b \sin^2 \phi$$

$$V_{\phi+90°} = v_b \cos^2 \phi + v_c \sin^2 \phi$$

$$V_{\phi+180°} = v_c \cos^2 \phi + v_d \sin^2 \phi$$

$$V_{\phi+270°} = v_d \cos^2 \phi + v_a \sin^2 \phi \qquad (1)$$

In this expression φ is an azimuthal angle that varies from 0° to 90° defined as the angular separation of the point of observation from one receiver. From Equation (1) $V_\phi$ interpolates the pressure field between receivers A and B, and $V_{\phi+90°}$ interpolates the pressure field between receivers B and C. $V_{\phi+180°}$ interpolates the pressure field between receivers C and D, and $V_{\phi+270°}$ interpolates the pressure field between receivers D and A. In the case of adjacent receivers which are separated by a arbitrary angle, Equation (1) must be modified to include this angular separation between the adjacent receivers. It is also noted that other interpolation methods may be used.

Once a pressure field has been calculated, it may be processed to determine the contributions of different kinds of waves. For example, subtracting the pressure field values at opposite angles (180° apart) determines the shear wave component of the pressure field. In this manner we can decompose the waveform along any azimuthal direction based on the principle of superposition (see N. Cheng et al., *Decomposition and Particle Motion of Acoustic Dipole Log in Anisotropic Formation,* Expanded abstracts of 65th annual meeting, Society of Exploration Geophysicists, pp. 1–4 (1995), incorporated herein by reference). Four receivers in the same horizontal plane (X-Y plane) thus provide sufficient information to estimate the shear wave orientations and velocities. The shear wave component (azimuthal cross component contribution from a dipole source) can be determined by the following equation:

$$V_{\phi(dipole)} = V_\phi - V_{100+180°}$$

$$V_{100+90°(dipole)} = V_{\phi+90°} - V_{\phi+270°} \quad (2)$$

Equation (2) allows us to graph the pressure field $V_\phi$ between 0° and 180° caused by a dipole source at any azimuthal angle.

The rotation of the acoustic logging tool causes the dipole source 200 to emit waveforms in which the particle motion will be either parallel to the earth fracture plane, orthogonal to the fracture plane, or at some angle in between. Assuming that the fracture plane is along the B-D direction of FIG. 2 (along the Y-axis coming out of the paper), at different times the source emits acoustic waves polarized orthogonal to the B-D direction and in parallel with it. Using equations (1) and (2) a graph of azimuthal angle (vertical axis) versus time (horizontal axis) can be constructed as shown in FIG. 4. In this figure, the shading indicates the amplitude of the pressure field. FIG. 4(*a*)–4(*c*) show three preferred embodiments of the acoustic logging tool with varying source orientations relative to the receivers. FIG. 4(*a*) illustrates the tool 402 in which the source acts along the A-C receiver axis. FIG. 4(*a*) corresponds to the tool shown in FIG. 2. Because the fracture plane is along the B-D direction, only slow shear waves are produced. In this source orientation only slow shear waves propagate because of symmetry properties of the anisotropic earth formation. As shown in the figure, the pressure field is most intense at 0° and 180°, 400, and goes to zero at 90° as equation 2 predicts. The preferred embodiment of FIG. 4(*b*) shows the resultant pressure field pattern for varying azimuthal angles for an acoustic logging tool 406 with the source acting along the B-D receiver axis. Thus, FIG. 4(*b*) corresponds to the tool shown in FIG. 2 but with the source rotated counterclockwise by 90° relative to the receivers. In this orientation, the emitted sound is polarized in the direction of the fracture plane and therefore fast shear waves are produced. As illustrated by FIG. 4(*b*) and as Equation 2 predicts, the pressure field is zero at azimuthal angles of 0° and 180° and reaches a maximum value at 90°, 404. Note that the transit time of the wave is reduced relative to FIG. 4(*a*). The preferred embodiment of FIG. 4(*c*) shows the resultant pressure field pattern for varying azimuthal angle for an acoustic logging tool, 412, with the source configured in an arbitrary orientation. This is the general case for an acoustic logging tool in which the source shown in FIG. 2 would not be along the X axis or Y axis but rather designed with an arbitrary orientation. In this orientation, after the dipole source is triggered, one part of the emitted sound is polarized in the direction of the fracture plane generating fast shear waves and another part of the emitted sound is polarized in a direction orthogonal to the fracture plane generating slow shear waves. As illustrated by FIG. 4(*c*) and as Equation 2 predicts, the fast shear waves pressure field 408 is a maximum at an azimuthal angle of 90° and the slow shear wave pressure field 410 is a maximum at an azimuthal angle of 0° and 180°. FIG. 4(*d*) illustrates the resulting pressure field for a source triggering other than along a fracture plane symmetry axis. This produces both fast and slow shear waves that are polarized parallel and perpendicular to the fracture plane, respectively. FIG. 4(*d*) utilizes the preferred embodiment of the tool given in FIG. 4(*a*) but in FIG. 4(*d*) the tool has rotated 45° clockwise to position 418 and therefore both fast and slow shear waves propagate along the borehole after the source emits sound along the A-C receiver axis. As illustrated by FIG. 4(*d*) and as Equation 2 predicts, the fast shear waves pressure field 414 is a maximum at azimuthal angles of 0° and 180°. FIG. 4(*d*) also clearly shows that the fast shear wave maximum amplitude is received prior to the slow shear wave. The slow shear wave 416 reaches a maximum pressure field at 90° as predicted by equation 2 and shown in FIG. 4(*d*).

FIG. 4 clearly demonstrates the slow and fast shear waves and, from these figures, one can easily identify the two polarized shear waves and their orientation in the case of a wave propagating in an anisotropic medium. For the case of an isotropic medium, the results using this method can still be used. For an isotropic medium, only one maximum pressure field will be shown in FIG. 4. An acoustic tool, as it logs, determines the velocity of waves produced by the source. The velocity is calculated by precisely determining the time needed for an acoustic wave to travel from the source to the receiver. Since the distance between the source and the receivers is known, the velocity of the wave can be calculated as dist/time.

As the acoustic tool logs, the pressure field at the four receivers is measured. Using equation 1, this data can be used to calculate the pressure field at any azimuthal angle. Equation 2 can then be used to calculate the dipole decomposition as shown in FIG. 4. A graph of dipole decomposition created from the four receivers from a single dipole source as a function of azimuthal angle and time creates unique plots as shown in FIG. 4 and discussed above. Analysis of these graphs can then be used to determine the time at which the source was oriented parallel or perpendicular to the fracture plane. Once this is known, shear wave orientations, velocities, and anisotropy values (transit time, energy, and slowness) can be calculated.

FIG. 5 summarizes an algorithm which permits calculation of the shear wave characteristics. Step 500 shows the processing which takes place on data gathered from each of the eight levels of receivers. In FIG. 5 the preferred embodiment of eight levels of receivers is used but eight levels is not mandatory and an arbitrary number of receiver levels may be used. Waveforms are collected at each of the four receivers A, B, C, and D at each level, see step 502. An SHARC™ Digital Signal Processor (DSP) A/D converter, such as that manufactured by Analog Devices, converts the analog receiver data into digital values. The SHARC™ DSP hardware is incorporated into the acoustic logging tool and thus the A/D conversion occurs downhole. As shown in FIG. 2, after conversion to a digital format, the waveform data is compressed and sent through a wire line 212 to a computer 214 uphole. The computer may be a UNIX™ based workstation or a similar performance machine. The remainder of the real-time processing of this data occurs uphole. Each of the waveforms is preprocessed by filtering and windowing block 504 to eliminate noise and undesirable components. Cross-component decomposition is performed using Equations 1 and 2 at step 506, as exemplified in FIG. 4. In step 508, the information derived from Equations 1 and 2 is used to identify the slow and fast shear waves and once the appropriate time index is calculated the orientation of the slow and fast shear waves and their velocities can be obtained. In step 510, the data from the processed waveforms at each of the levels of the receivers are analyzed and the velocity along the receiver array is accurately determined, in step 512. Finally, the orientation of the slow and fast shear waves is calculated and verified for each level of receivers as well as the transit time, energy, and slowness anisotropy.

Numerous variations and modifications will become apparent to those skilled in the art once the above disclosure is fully appreciated. It is intended that the following claims be interpreted to embrace all such variations and modifications. By way of example, it is recognized that the disclosed method for determining shear wave velocity and orientation may be implemented using any number of receiver levels and different receiver types for the acoustic logging tool. In addition, at each level of receivers more than four receivers may be used. It is further recognized that the source may be located at any arbitrary angle relative to the receivers as shown in FIG. 4. Finally, it is further recognized that processing of the data after collection at receivers can be performed downhole in real time with only the results being transferred uphole to a computer system for storage.

What is claimed is:

1. A method for determining shear wave velocity and orientation in an earth formation comprising:
   (a) generating acoustic signals within a borehole using one dipole source;
   (b) measuring said acoustic signals at receivers after the acoustic signal propagates along the borehole; and
   (c) processing said acoustic signals, wherein said processing includes interpolating the pressure field between any two adjacent receivers.

2. The method as defined in claim 1 further comprising processing said wave signals to determine transit time anisotropy.

3. The method as defined in claim 1 further comprising processing said wave signals to determine energy anisotropy.

4. The method as defined in claim 1 further comprising processing said wave signals to determine slowness anisotropy.

5. The method as defined in claim 1 wherein step (b) comprises using at least four source-independent pressure transducer receivers configured to measure pressure fields.

6. The method as defined in claim 1 wherein step (c) comprises performing cross-component decomposition on the pressure fields to determine shear wave orientation and velocity.

7. An apparatus for determining shear wave velocity and orientation in an earth formation, comprising:
   at most one source capable of generating acoustic signals within a borehole;
   at least four source-independent pressure transducer receivers capable of receiving acoustic signals from the formation; and
   a processing device capable of processing said acoustic signals, wherein said processing device interpolates the pressure field between two adjacent receivers.

8. The apparatus of claim 7 further comprising said processing device processing said acoustic signals to determine transit time anisotropy.

9. The apparatus of claim 7 further comprising said processing device processing said acoustic signals to determine energy anisotropy.

10. The apparatus of claim 7 further comprising said processing device processing said acoustic signals to determine slowness anisotropy.

11. The apparatus of claim 7 wherein said one source comprises using a single dipole source.

12. The apparatus of claim 7 wherein said processing further comprises performing cross-component decomposition on the pressure field to determine shear wave orientation and velocity.

13. A apparatus for determining shear wave velocity and orientation in an earth formation, comprising:
   a single dipole source capable of generating acoustic signals within a borehole;
   at least four receivers capable of receiving acoustic signals from the earth formation and configured to measure pressure fields;
   a processing device capable of processing said acoustic signals;
   wherein said processing device interpolates the pressure field between any two adjacent receivers and performs cross-component decomposition on the pressure field to determine shear wave orientation and velocity.

14. The apparatus as defined in claim 13 wherein processing said acoustic signals occurs at a remote processing facility after storing the measurements of the acoustic signals on a memory device.

15. A method for determining anisotropy in an earth formation, comprising:
   measuring pressure fields at four circumferentially spaced receivers;
   interpolating the pressure fields between any two adjacent receivers; and
   subtracting pressure fields 180° apart to detect shear waves.

* * * * *

UNITED STATES PATENT AND TRADEMARK OFFICE
CERTIFICATE OF CORRECTION

PATENT NO. : 6,188,961 B1
DATED : February 13, 2001
INVENTOR(S) : Batakrishna Mandal It is certified that error appears in the above-identified patent and that said Letters Patent is hereby corrected as shown below:

<u>Title page,</u>
Item [73] Assignee: change "Hilliburton" to -- Halliburton --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*